United States Patent [19]

Weld

[11] 4,297,804
[45] Nov. 3, 1981

[54] CHUMATE

[76] Inventor: David B. Weld, 3829 Carfax Ave., Long Beach, Calif. 90808

[21] Appl. No.: 99,561

[22] Filed: Dec. 3, 1979

[51] Int. Cl.³ ............................................. A01K 97/04
[52] U.S. Cl. ............................................ 43/55; 43/56
[58] Field of Search ........................... 43/44.99, 55, 56

[56] References Cited

U.S. PATENT DOCUMENTS

| | | | |
|---|---|---|---|
| 2,657,496 | 11/1953 | Spotswood | 43/55 |
| 2,767,508 | 10/1956 | Kiember | 43/56 |
| 2,842,890 | 7/1958 | Goroni | 43/44.99 X |
| 3,009,281 | 11/1961 | Unger | 43/56 |
| 3,304,645 | 2/1967 | Hardesty | 43/55 |
| 3,367,061 | 2/1968 | Brandemihl | 43/55 |

Primary Examiner—Stephen G. Kunin
Assistant Examiner—K. Bradford Adolphson
Attorney, Agent, or Firm—Ronald L. Juniper

[57] ABSTRACT

A floating container, specially adapted to hold live bait, which is shaped like a small boat so that it can be pulled behind a fishing vessel without sinking. The container is transparent so that the bait carried therein can be seen and thus attract game fish in the surrounding water. The container is structured to provide proper aeration for the bait, yet allow access to it when needed. Closure doors are positioned to shut independently when the container is being towed.

5 Claims, 5 Drawing Figures

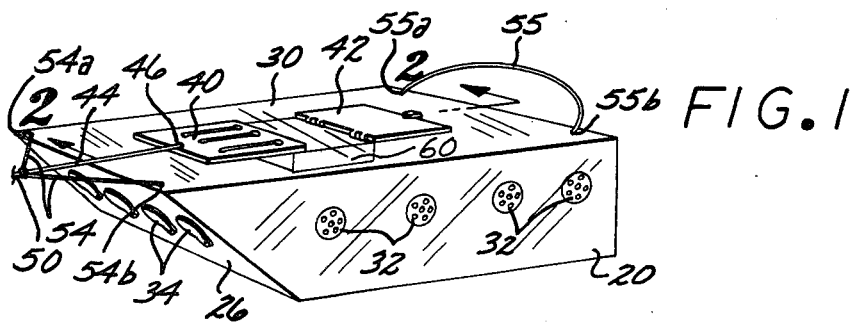
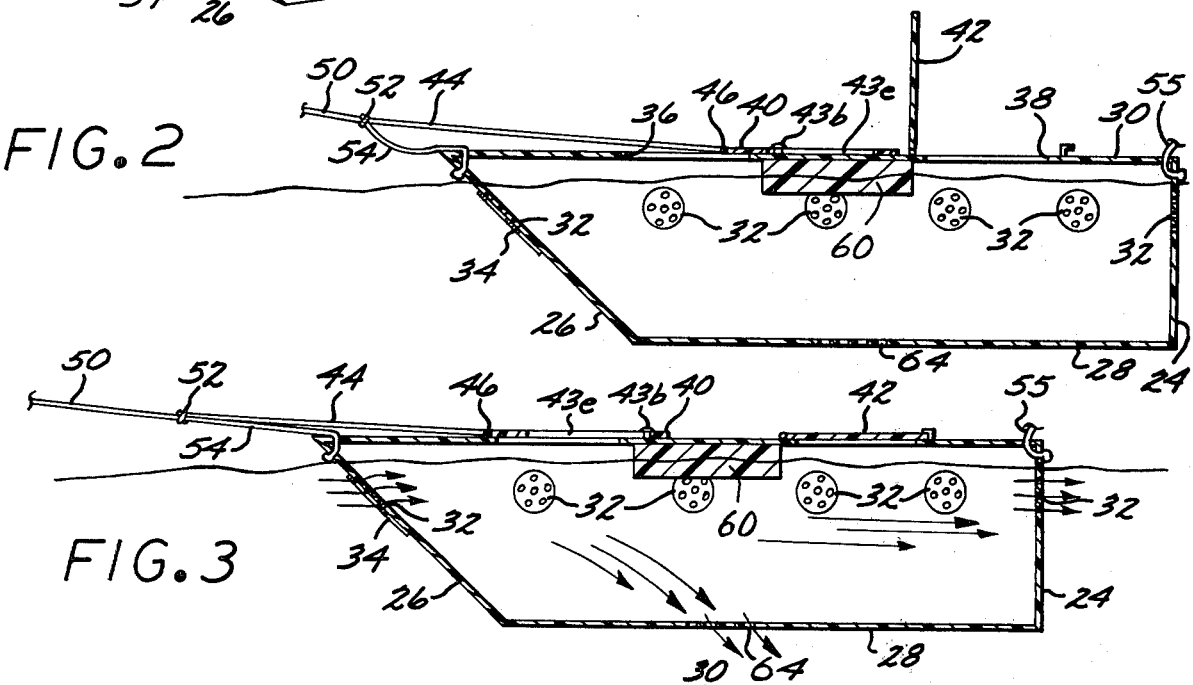
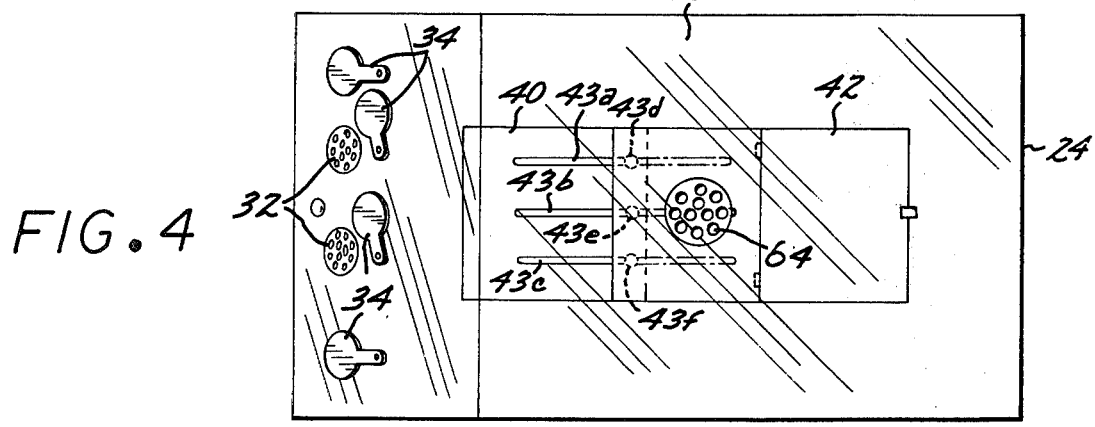
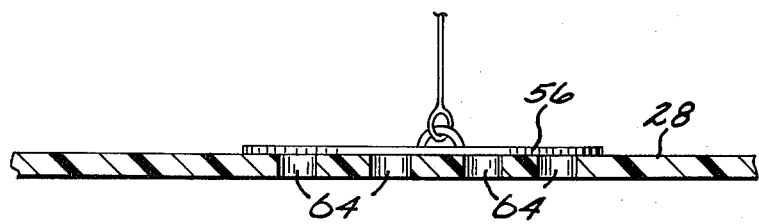

CHUMATE

BACKGROUND OF THE INVENTION

Providing the most adequate means to keep live bait fresh and ready for use by operators of fishing boats has been a problem which often-times required compromising convenience and expense. That is, devices that did this job adequately were often expensive and cumbersome, but the less expensive equipment did not perform well at all.

Also, though attracting game fish by "chumming" was desirable, this entailed inconvenience and loss of the bait when it was thrown overboard as in the conventional chumming method.

Furthermore, many bait tanks occupied valuable space in boats (particularly small ones) whereas towing of bait tanks in the water tended to limit the speed at which boats could pull them.

SUMMARY OF THE INVENTION

It is the object of this invention to overcome the previously mentioned and other problems and to provide the advantages such as hereinafter described.

Thus, a bait tank in accordance with this invention is provided with flotation and shaped with a slanting forward bow and flat bottom adequate to ride like a small boat behind the towing boat.

The bait tank is made of transparent material so that the bait contained therein can be seen by game fish which are attracted to it.

Openings are provided in the bait tank which allow aeration but prevent too much water from entering. Doors for removing and loading bait feature self-closing mechanisms as desired.

BRIEF DESCRIPTION OF THE DRAWINGS

FIG. 1 is an isometric view of a bait tank in accordance with this invention with attached towing and closing ropes.

FIG. 2 is a longitudinally sectioned view of the bait tank as taken through 2—2 in FIG. 1 showing the top doors open while the tank is not being pulled.

FIG. 3 is a view as in FIG. 2 showing the closure of the top doors and water flow when the tank is moved by the towing ropes.

FIG. 4 is a planview of the top of the bait container tank.

FIG. 5 is a fragmented, partially sectioned, view showing the bottom drain holes with a removable stopper fitted in place thereover as a closure means.

DESCRIPTION OF A PREFERRED EMBODIMENT OF THE INVENTION

A bait tank in accordance with this invention as shown in the drawings is comprised of a container formed from transparent rigid walls sealed together at their joining edges so as to be water tight. These include side walls 20 and 22 joined together at the rear by back wall 24, at the front by upwardly slanting bow wall 26, on the bottom by base plate 28 and on the top by loading cover 30.

The walls are provided with multiple aeration holes 32 so that water in the container can have a flow flush through it thus providing oxygen for bait fish held therein. The aeration holes 32 in the front bow wall 26 have swivelly mounted shut-off doors 34 mounted adjacent to the aeration holes adapted to be pivoted to close them so that when the tank is being pulled in water excessive water will not enter these holes. This is to avoid drowning of live bait carried in the container by forcing water to flow hard through these holes.

The top cover 30 is provided with spaced loading openings 36 and 38 made large enough to easily receive and allow removal of live bait. These openings 36 and 38 are closed, respectively, by trap-type doors 40 and 42 movably mounted adjacent thereto on the top cover 30. Door 42 is hingedly mounted for opening as best shown in FIG. 2. Door 40 is provided with three longidudinally aligned parallel slots 43A, 43B and 43C through which, respectively, upright pegs 43D, 43E and 43F (centrally aligned across the adjacent top cover 30) project to guide door 40 for sliding movement thereon.

In order to assure that the door 40 is closed when the container is being towed a stretch cord closing line 44 extends from its rear connection 46 on the forward edge of door 40 with just enough length to pull shut when secured to towing rope 50 at pulling connection 52. One end of towing rope 50 is attached to a bow loop 54 mounted in the upper front portion of bow plate 26. The other end of towing rope 50 is attached by suitable means (not shown) to the user's boat.

Bow loop 54 is attached to bow plate 26 and adjoining top cover 30 through spaced forward corner holes 54A and 54B. Bow loop 54 and a similar stern loop 55 attached through rear corner 55A and 55B in top cover 30 near back wall 24 provide hand-grips for manually lifting the container.

The location of pulling connection 52 of closing line 44 on towing rope 50 is spaced so that when rope 50 is pulled tight closing line 44 is pulled down to close connected trap door 40 as shown in FIG. 3. On the other hand, when rope 50 is released connected line 44 is also released so that trap door 40 can be opened as shown in FIG. 2. The length of line 44 between its connections 46 and 52 is predetermined to achieve the above results.

Also, the mere drifting of the bait tank away from the boat will be sufficient to close sliding door 40 by pulling on rope 50.

Drain holes 64, which are smaller than the smallest bait to be used to prevent its escape, are provided in the center of bottom plate 28. These holes are sealingly closed by a rubber stopper plug 56 which is adapted to be mounted for closure in an encircling flush position. Since these drain holes 64 are the only ones in the bottom of the tank water can be retained in the tank when it is lifted when plug 56 closes these holes. Thus, bait can be safely carried in the tank when it is removed from surrounding water without releasing water therein.

In order to provide the proper level of flotation, suitable buoyant flotation material is provided in a layer 60 inside of the bait tank container secured to the underside of loading cover 30 between openings 36 and 38. The flotation material can be made of variable colors which are selected as lures to attract fish to the tank.

Thus, by this unique invention a structure has been created for chumming with live bait in a transparent, aquarium-type tank having continuous aeration.

In use the bait tank is filled with water and the live bait dropped into it through openings 36 and 38. Then the bait tank is put into the water and the towing rope 50 attached thereto is secured to a suitable towing boat. When the towing boat is under way towing rope 50 pulls connected closing cord 44 tight thereby causing attached door 40 to shut over opening 36.

When the towing boat moves at high speed the doors 34 are closed over holes 32 to prevent entry of water. The bait tank will ride behide the towing boat like a small boat because of its construction and will not dip deeper into the water under tow because of the slanted bevel of bow wall 26.

Though a particular detailed description of a preferred embodiment of this invention has been shown and described herein this is not meant as a limitation but as exemplicative only of a form of this development which is intended to be limited only by the spirit of the following claims.

What is claimed is:

1. An aquarium-type floating bait tank including:
    an enclosed boat-shaped container having oppositely disposed top and bottom walls suitable for high speed pulling, holding water and carrying live bait therein, said container being made substantially of transparent material so that bait carried within it can be seen from surrounding water when floated therein;
    said enclosed container having aeration holes positioned to supply fresh air to water carried therein, a bait opening in the top wall of said container, drain holes in the bottom wall of said container and plug means to selectively close said drain holes;
    flotation means mounted on said container adapted to hold it at preselected floating levels when in water;
    a closable door mounted on said container so as to be able to seal shut said bait opening in the top wall thereof; and
    a towing rope connected on one end to said container, a closing line connected between said towing rope and said closable door wherein said closing line connections are predeterminedly positioned so that when said towing rope is pulled tight the connected closing line will automatically pull said door closed and when loosened said door can be opened.

2. A bait tank as defined in claim 1 including a wall slanted upwardly from the bottom wall to the top wall which prevents said container from dipping deeper into the water when being pulled.

3. A bait tank as defined in claim 2 wherein said inclined wall of said container is provided with aeration holes and swivelly mounted doors positioned to be able to close said aeration holes.

4. A bait tank as defined in claim 1 wherein said flotation is provided in layers of variable coloration to act as a lure to attract fish.

5. A bait tank as defined in claim 1 which includes a second bait opening in the top wall of said container, a second door mounted to close over said second bait opening.

* * * * *